United States Patent [19]

Fabian et al.

[11] 4,018,736

[45] Apr. 19, 1977

[54] MANUFACTURE OF POLYESTER-IMIDE POWDERS

[75] Inventors: Wolfgang Fabian, Wilhelmsfeld; Jenoe Kovacs, Bobenheim-Roxheim, both of Germany

[73] Assignee: Badische Anilin- & Soda-Fabrik Aktiengesellschaft, Ludwigshafen (Rhine), Germany

[22] Filed: Dec. 8, 1975

[21] Appl. No.: 638,958

[30] Foreign Application Priority Data

Dec. 20, 1974 Germany .......................... 2460472

[52] U.S. Cl. .................. 260/29.2 N; 260/75 T; 528/481
[51] Int. Cl.$^2$ ............... C08G 63/44; C08J 3/12
[58] Field of Search ............. 528/481; 260/29.2 N, 260/75 T

[56] References Cited

UNITED STATES PATENTS

| | | | |
|---|---|---|---|
| 3,311,601 | 3/1967 | Conley | 528/481 |
| 3,554,939 | 1/1971 | Lavin et al. | 260/29.2 N |
| 3,625,873 | 12/1971 | Wilson | 260/292 N |
| 3,966,655 | 6/1976 | Kovacs et al. | 260/29.2 N |

Primary Examiner—Murray Tillman
Assistant Examiner—A. H. Koeckert

[57] ABSTRACT

A process for the manufacture of finely divided polyester-imide powders wherein solutions of polyester-imides in organic solvents are solidified by cooling, the solvent is removed by sublimation and the solid product is pulverized. The powders may be used, as aqueous dispersions, to produce heat-resistant coatings on metallic conductors.

4 Claims, No Drawings

MANUFACTURE OF POLYESTER-IMIDE POWDERS

The invention relates to a process for the manufacture of finely divided polyester-imide powders, and to aqueous dispersions of such powders.

Polyester-imides are used to produce heat-resistant coatings on metals, especially for the purpose of insulating electrical conductors. As a rule, the polyester-imides are applied to the metal surface in the form of their solution in organic solvents and are then baked onto the metal. German Published Application 2,210,484 recommends the use of the polyester-imides in the form of aqueous dispersions, which cause much less pollution of the environment. In their manufacture, the polyester-imides are in general obtained as melts. The latter are solidified and the product is comminuted; in the above process, the product is then dispersed in water and can at the same time be milled once more. However, it has been found that coatings produced on electrical conductors by means of such dispersions frequently exhibit unsatisfactory mechanical properties; in particular, the resistance of the coatings to heat shock leaves something to be desired.

A widely used method of isolating organic substances from aqueous solutions is freeze-drying. This process is described in detail in Houben-Weyl, Methoden der organischen Chemie, Volume I/1, pages 939 – 956. Since it is above all applied to heat-sensitive materials, eg. biological substances, drugs and foodstuffs, it was not an obvious step also to apply freeze-drying to heat-resistant plastics.

According to German Patent 1,089,331 and German Published Application 2,017,904 freeze-drying may also be employed to isolate synthetic polymeric plastics. However, the plastics concerned have quite specific structures, namely they are in a fibrous state or are porous molding compositions. Hence it was not obvious, even in the light of these publications, to apply the process to the manufacture of finely divided powders to be used for heat-resistant coatings.

It is an object of the present invention to provide a simple and inexpensive process for the manufacture of finely divided polyester-imide powders. It is a further object of the present invention to provide a method of making aqueous dispersions of such powders, which on application to electrical conductors and subsequent baking give coatings having good mechanical and thermal properties, in particular high resistance to heat shock.

We have found that this object is achieved by a process for the manufacture of finely divided polyester-imide powders wherein solutions, of from 5 to 60% strength by weight, of a polyesterimide, with or without assistants, in an organic solvent having a freezing point of from +20° to −30° C are cooled to a temperature below the freezing point of the solvent, the solvent is removed by sublimation under reduced pressure and the solid solvent-free product is pulverized.

Polyester-imides are polycondensation products of aromatic polycarboxylic acids, polyhydric alcohols and polyacid amines. They generally contain from 0.5 to 7, and preferably from 1 to 5, % by weight of imide nitrogen in the form of five-membered imide rings which are fused to aromatic nuclei. The following starting materials may be used for their manufacture: 10 equivalents of aromatic tricarboxylic or tetracarboxylic acids, their anhydrides or esters, eg. trimellitic acid, pyromellitic acid or their anhydrides, if appropriate together with aromatic dicarboxylic acids or their esters, eg. terephthalic acid, isophthalic acid or naphthalenedicarboxylic acid, and their lower alkyl esters; from 5 to 20 equivalents of lower aliphatic diols, if appropriate together with trihydric or tetrahydric alcohols, eg. ethylene glycol, propylene glycol and butanediol together with glycerol, trimethylolpropane or tris-hydroxyethyl isocyanurate; and from 1 to 5 equivalents of di- or tri-primary amines, eg. ethylenediamine, hexamethylenediamine, benzidine, diaminodiphenylmethane, diaminodiphenyl ketone, diaminodiphenyl ether or diaminodiphenyl sulfone, phenylenediamine, toluylenediamines, xylylenediamines or melamine.

It is possible either to co-condense the starting materials, preferably in the presence of solvents, or to employ precondensates, eg. diimide-dicarboxylic acids obtained from 2 moles of trimellitic anhydride and 1 mole of a di-primary aromatic amine.

The manufacture of polyester-imides is described, eg., in German Printed Applications 1,445,263, 1,495,100, 1,495,152 and 1,645,435 and in German Published Application 2,412,471.

In their manufacture, the polyester-imides are in general obtained as solutions or melts. According to the invention, these are now converted to solutions, of from 5 to 60% strength by weight, in an organic solvent which has a freezing point of from +20° to −30° C. The preferred solvent is dioxane. Where the assistants mentioned later are used, these may be added — wholly or partially — to the solvent, in addition to the polyester-imide, at this stage.

The solution is then cooled to below the freezing point of the solvent. This may be carried out batchwise but in industrial operation a continuous method is preferred, wherein the solution is applied to, eg., a continuous belt, and cooled and solidified thereon, and the solidified product is finally detached from the belt and then freed from the solvent under reduced pressure by bringing the pressure to a value below the vapor pressure of the solvent at the freezing point. Preferably, the pressure is from 3 to 10 mm Hg below the vapor pressure of the solvent at the three-phase point. As a result, the material to be dried automatically assumes a temperature below the freezing point of the solvent. However, the solvent can also be sublimed off the solidified mixture by passing a stream of gas. eg. air or nitrogen, over the surface of the solid phase; advantageously, the stream of gas is at a temperature equal to or slightly above the freezing point of the solvent. This process, again, can be carried out continuously using a tower under reduced pressure, fitted with several trays rotating about a longitudinal axis, with the material to be dried being fed slowly onto successively lower trays. The solvent may be condensed and recycled.

The product dried by the process of the invention is obtained in the form of loose, foam-like aggregates which disintegrate even on light touch, but above all on crushing or grinding, to give a loose powder of average particle size from about 5 to 200μ. This powder can be comminuted further by milling. It may be used directly for powder coating of metals to give heat-resistant coatings, and can be applied by conventional methods of fluidized bed sinter-coating or electrostatic coating.

Preferably, however, the powder — with or without assistants — is dispersed in water, using from 40 to 80 parts by weight of water for from 20 to 60 parts by weight of powder. The powder may be comminuted further in the aqueous phase, eg. by dispersion milling, giving a dispersion wherein the particles have an average diameter of less than 1$\mu$, and preferably of less than 0.5$\mu$, with more than 99% of the particles having a diameter of less than 1$\mu$.

The dispersion may contain conventional assistants which are added either before freeze-drying or only at the dispersion stage. These assistants may include:

Suspension stabilizers used in amounts of from 1 to 5%, eg. polyvinylpyrrolidone, copolymers of vinyl propionate and vinylpyrrolidone, polyacrylic acid or partially saponified copolymers of acrylic acid esters and acrylonitrile;

Surface-active materials used in amounts of from 0.1 to 2% by weight, eg. polyvinyl alcohol, cellulose ethers or gelatine;

Flow control agents, used in amounts of from 1 to 10% by weight, eg. butanediol, diethylene glycol, glycol monoethers, dimethylformamide, dimethylacetamide or N-methylpyrrolidone;

Thickeners, used in amounts of from 0.1 to 2% by weight, eg. high molecular weight polyvinylpyrrolidone or vinylpyrrolidone copolymers;

Anti-thixotropic agents, used in amounts of from 0.05 to 3% by weight, eg. ethanolamine or triethanolamine;

Neutralizing agents, used in amounts of from 0.1 to 3% by weight, eg. hexamethylenetetramine or other amines;

Baking catalysts, used in amounts of from 0.5 to 5% by weight, eg. triethanolamine titanate, oxotitanium lactate or oxotitanium oxalate; and pigments, fillers or dyes, added to achieve special effects.

The dispersions of the invention may be employed as nonwoven binders, adhesives or laminating agents. Preferably, however, they are used for the manufacture of heat-resistant coatings on metal surfaces, particularly on metal conductors, eg. for insulating copper wires. To produce such coatings, the dispersions are applied to the wires by conventional equipment and are then baked at above 230° C and preferably at from 250° to 500° C. This produces further condensation and crosslinking of the polyesterimides. Heat-resistant coatings are obtained, which have a maximum sustained use temperature (according to DIN 53,446) above 120° C and preferably above 150° C. Highly heat-resistant coatings are obtained, above all, if aromatic amines are used in the manufacture of the polyester-imides and if trifunctional crosslinking components are included. The coatings have excellent mechanical properties, in particular high resistance to heat shock, and good gloss and hardness as well as satisfactory resistance to repeated flexing.

In the Examples, parts and percentages are by weight.

EXAMPLE 400 g of a polyester-imide condensate manufactured by poly-condensation of 25 parts of dimethyl terephthalate, 46.9 parts of a reaction product of 2 moles of trimellitic anhydride and 1 mole of diaminodiphenylmethane, 36.7 parts of glycol and 29.2 parts of trishydroxyethyl isocyanurate (a mixture of 10 parts of polymer and 20 parts of N-methylpyrrolidone having a dynamic viscosity of 64 cSt at 30° C) were dissolved by adding, a little at a time, to 400 ml of dioxane, while stirring. A viscous solution was obtained and was poured into a shallow metal container. The latter was cooled to below −10° C by means of a mixture of solid carbon dioxide and acetone, whereupon the solution solidified. The dioxane was sublimed off in a vacuum cabinet on the course of 12 hours at a pressure of from 0.5 to 1 mm Hg. The temperature was then raised to 50° C for 4 hours. A foam-like loose material was obtained, which was pulverized on a conventional laboratory mill. The powder obtained may be used as a surface-coating powder. To produce an aqueous dispersion, 400 g of the powder were dispersed in 600 g of water, whilst stirring, and the dispersion, together with 3% of a protective colloid consisting of a copolymer of vinylpyrrolidone and vinyl propionate, 0.5% of polyvinyl alcohol and 0.5% of polyvinylpyrrolidone was briefly pumped through a laboratory dispersing mill at a rate of 30 l per hour. A fine dispersion with particles of diameter less than 1$\mu$ was produced.

1% of triethanolamine and 1.5% (based on solids) of triethanolamine titanate were then added to the dispersion. 1 mm thick copper wires were coated with this dispersion on a 2.5 m long wire-lacquering machine at 500° C and a rate of from 5 to 8 m/minute. The coating is 25$\mu$ thick.

The results obtained on testing the coated wires were:

pencil hardness: 4 to 5 H. Resistance to heat shock, according to DIN 46,453;

when prestretched by 20%, the wires are still in good order after one hour's treatment at 220° C.

In a Comparative Experiment, wires were coated with a dispersion which had been produced conventionally by milling the solidified polyester-imide melt in an impact-disc mill, dispersing the coarse powder in water and further milling the dispersion in a ball mill. On testing the resistance to heat shock, it was found that when prestretched by 10%, the wires are in good order after one hour's treatment at 200° C; after one hour's treatment at 220C the wires are not in order even without prestretching.

We claim:

1. A process for the manufacture of finely divided polyesterimide powders wherein solutions, of from 5 to 60% strength by weight, of a polyester-imide, optionally together with assistants, in an organic solvent having a freezing point of from +20° to −30° C are cooled to a temperature below the freezing point of the solvent, the solvent is removed by sublimation under reduced pressure and the solid solvent-free product is pulverized.

2. A process for the manufacture of finely divided polyester-imide powders as claimed in claim 1, wherein the polyesterimide is polycondensation product of aromatic polycarboxylic acids, polyhydric alcohols and polyacid amines, which contains from 0.5 to 7% by weight of imide nitrogen in the form of five-membered imide rings which are fused to aromatic nuclei.

3. A process for the manufacture of finely divided polyester-imide powders as claimed in claim 1, wherein dioxane is used as the solvent.

4. An aqueous dispersion of a polyester-imide powder, which contains from 40 to 80% by weight of water and, if appropriate, dispersing assistants, and from 60 to 20% by weight of a polyester-imide powder obtained by the process as claimed in claim 1 and having an average particle diameter of less than 1$\mu$.

* * * * *